UNITED STATES PATENT OFFICE.

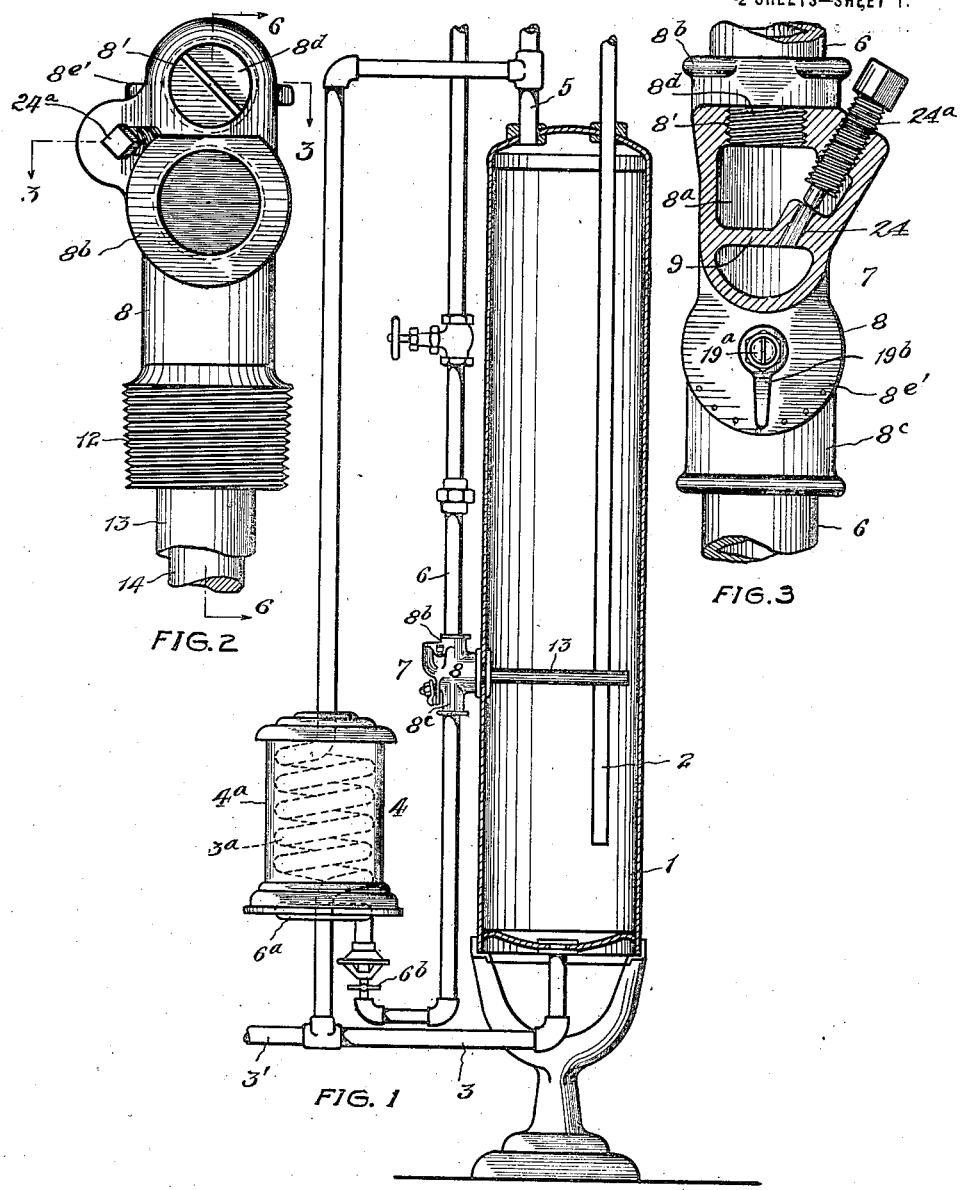

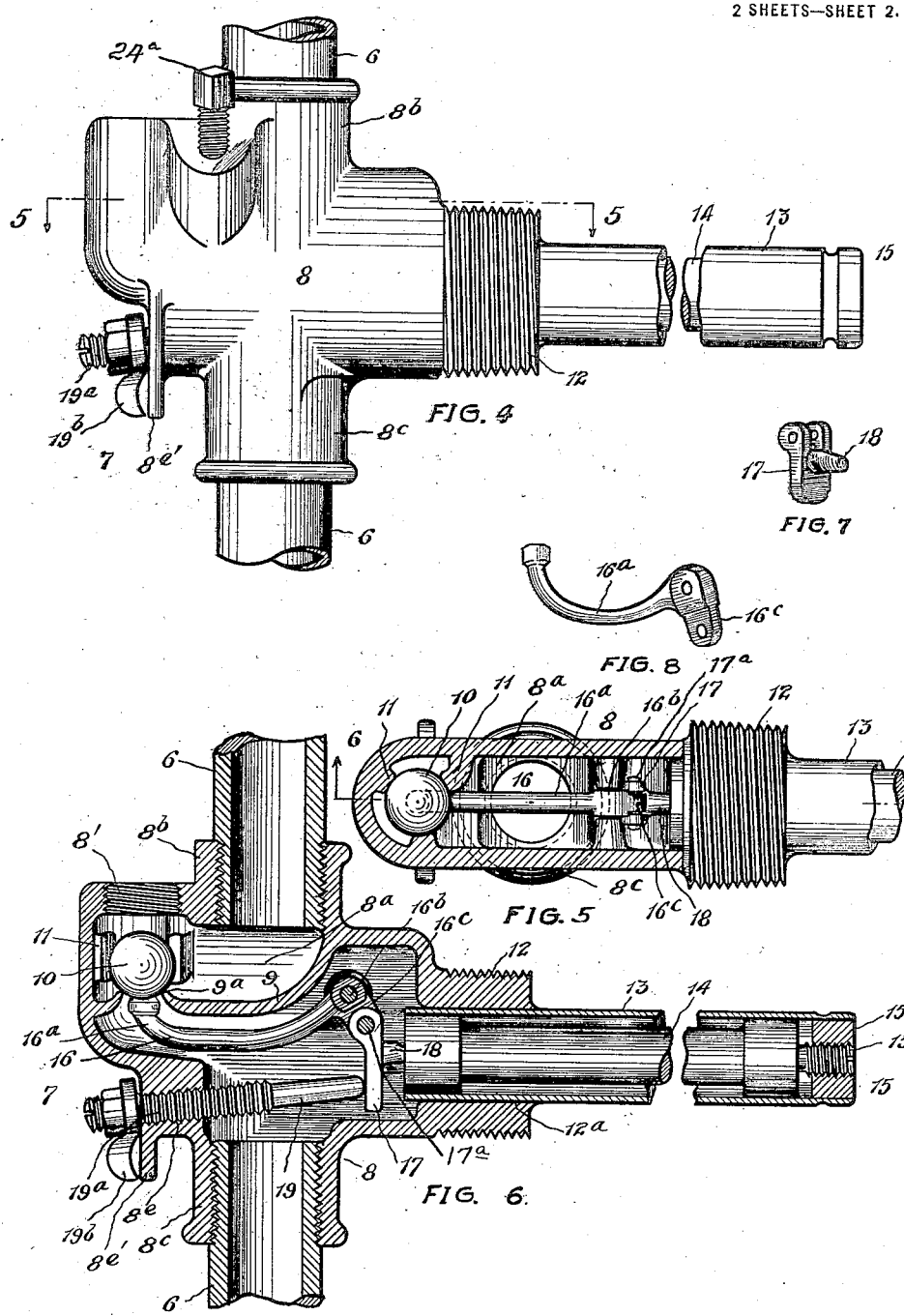

MILEY W. THOMAS, OF CLEVELAND, OHIO, ASSIGNOR TO THE YODER-THOMAS MANUFACTURING COMPANY, OF CLEVELAND, OHIO, A CORPORATION OF OHIO.

VALVE MECHANISM.

1,402,189.     Specification of Letters Patent.     Patented Jan. 3, 1922.

Application filed August 24, 1918. Serial No. 251,239.

*To all whom it may concern:*

Be it known that I, MILEY W. THOMAS, a citizen of the United States, residing at Cleveland, in the county of Cuyahoga and State of Ohio, have invented certain new and useful Improvements in and Relating to Valve Mechanism, of which the following is a specification.

This invention relates to automatically controlled valve mechanism, particularly of the thermostatic type, especially adapted to control gaseous fuel, whereby the supply thereof may be economically controlled for heating purposes.

One object of the invention is to provide an improved valve operating mechanism capable of accurate and minute adjustment throughout a relatively wide range, whereby the medium to be heated can be kept at any desired degree of temperature.

Another object of the invention is to provide an improved system of levers capable of transmitting positive motion to the valve by a relative small expansion or contraction of the thermostatic element or elements, whereby the valve will be opened and closed with a quick action due to operation of the thermostat through a relatively short range.

Another object of the invention is to provide an operating mechanism of relatively simple construction, comprising a few elements but correlated to open and close the valve by the movement of the thermostatic element or elements under the influence of slight changes in temperature of the controlling medium acting upon the latter.

Another object of the invention is to provide an improved valve and operating mechanism therefor adapted to economically control the supply of fuel, whereby the cost of the latter is reduced to a minimum.

These and other objects of the invention will be apparent to those skilled in the art to which my invention relates, from the following description taken in connection with the accompanying drawings.

For the purpose of illustration I have, in the accompanying drawings, shown and herein described one form of mechanism embodying my invention.

Fig. 1 is a view of a water tank in section, a heater therefor and a valve controlled mechanism, embodying my invention, associated with the tank for controlling the supply of fuel to the heater.

Fig. 2 is a top plan view of the valve controlled mechanism, the thermostatic elements being broken away.

Fig. 3 is a section on the line 3—3 of Fig. 2.

Fig. 4 is a side elevation of the valve controlled mechanism.

Fig. 5 is a horizontal section on the line 5—5 of Fig. 4.

Fig. 6 is a longitudinal section on the line 6—6 of Figs. 2 and 5.

Figs. 7 and 8 are detail views of the valve operating devices.

In the drawings, I have illustrated the application of invention for heating water in a tank and maintaining it at any desired temperature, but it is equally adapted to heat any other medium, for example, air in a room or confined space.

1 indicates a tank adapted to contain water. 2 indicates a water supply pipe, which is connected to the tank in any suitable manner. 3 indicates a pipe leading from the bottom of the tank 1. The pipe 3 passes up through a suitable heater 4; the pipe 3 is connected to a pipe 5 which is connected to the upper end of the tank 1 in a well known manner. 3' indicates a pipe for draining the tank 1. The pipe 3' is preferably connected to the pipe 3 leading from the bottom of the tank 1 to the heater 4. The pipe 3' may be controlled by a suitable valve (not shown). The pipe connections to and from the tank and between the heater and tank may be arranged in any desired way. The heater casing 4ª is preferably of annular shape. The pipe 3 may be coiled within the casing 4ª, as shown at 3ª, in the usual manner.

6 indicates a fuel supply pipe, preferably for gaseous fuel, leading to a burner 6ª in the lower part of the heater casing 4ª. 6ᵇ indicates a valve for cutting off or regulating the supply of fuel at a point adjacent to the burner. The pipe 6 or a portion thereof is preferably arranged adjacent to the tank 1 so that the operating parts and thermostat of the valve mechanism, indicated at an entirety at 7, can be connected or associated together in a simple manner.

The valve mechanism 7 is interposed in the pipe 6 so as to control the flow of gas therethrough to the burner 6ª. Of this mechanism, 8 indicates a casing shaped and constructed in any well known manner to form a chamber 8ᵃ, and pipe sections 8ᵇ, 8ᶜ, to which the ends of the pipe 6 (see Fig. 6) are connected. 9 indicates an internal wall or division plate extending across the chamber 8ᵃ. This wall is formed with an opening 9ᵃ, the edge of which forms a seat for a valve 10. The upper circumferential edge of the opening 9ᵃ is preferably ground or otherwise finished to form a suitable seat for the valve 10. Preferably, the seat is ground to a relatively fine edge. The valve opening 9ᵃ is preferably arranged near the outer end of the casing 8, so that the valve can be arranged in a position to permit its assembly or removal. For this purpose, the casing 8 is formed with an opening 8′, which may be closed by a screw plug 8ᵈ. The valve 10 preferably comprises a ball normally resting on the seat and maintained thereon by its weight and the pressure of gas within the supply pipe 6. 11 indicates guides extending inwardly from the inner walls of the chamber 8ᵃ. The guides 11 serve to guide the valve 10 in its up and down movements to insure its proper and quick seating on the seat 9ᵃ. I preferably provide a plurality of guides 11 and substantially and uniformly space them around the chamber 8ᵃ, as shown in Fig. 5. The guides 11 are preferably formed integral with the walls of the casing 8.

At one side, the casing 8 is provided with a plug or head 12, preferably formed integral with the walls of the casing. The outer wall of the plug 12 is provided with screw threads to fit a screw-threaded opening in the side wall of the tank 1. The head 12 is connected to the tank 1 in a manner which prevents leakage through the connection.

12ᵃ indicates an opening extending through the plug 12 and adapted to receive the inner ends of the thermostat elements 13, 14. The element 13 preferably comprises a section of tubing formed from copper or other material capable of readily expanding under the influence of heat. The inner end of the tube 13 fits tightly within the opening 12ᵃ, preferably extending to the inner end thereof. The tube 13 may be soldered or otherwise secured in the opening 12ᵃ. The element 14 is preferably formed from some material, such as porcelain, which is not to any substantial extent affected by temperature changes. At their outer ends, the elements 13, 14, are connected together, as shown at 15, in any suitable manner, so that the expansion and contraction of the tube 13 will move the element 14 endwise in one direction or the other accordingly as the temperature of the water surrounding the tube 13 rises or falls. The connection 15 preferably comprises a plug 15ᵃ, which closes the outer end of the tube 13, having a screw-threaded opening through it and a rod 15ᵇ extending through the opening. The rod 15ᵇ is provided with screw threads to fit the screw threads of the opening in the plug 15ᵃ and its outer end is formed with a suitable slot to receive a tool by which the element 14 can be adjusted longitudinally relative to the element 13. The outer end of the tube 13 may be secured to the plug 15ᵃ in any desired manner. Since the inner end of the element 13 is fixed to the casing 8 and its outer end is connected to the outer end of the element 14, it will be understood that when the temperature of the medium surrounding the element 13 rises, the latter expands and moves the element 14 endwise towards the right, as viewed in Fig. 6; on the other hand, when the temperature of the medium falls, the element 13 contracts and moves the element 14 endwise in the opposite direction. The connection 15 is preferably of an air or gas and water tight character.

16 indicates the valve operating devices interposed between the valve 10 and thermostat elements 13, 14, and preferably arranged in the chamber 8ᵃ, below the division wall 9, of these devices, 16ᵃ indicates a main lever pivotally mounted in the chamber 8ᵃ in any suitable manner, but preferably upon a horizontal shaft 16ᵇ, the opposite ends of which are supported in the opposite side walls of the casing 8. The outer or free end of the lever 16ᵃ is arranged to engage the valve 10 and lift it from its seat, as will be later described. At or near its opposite end, the lever 16ᵃ is provided with a depending arm or device 16ᶜ, to and on which is pivotally mounted a lever or link 17 arranged in the path of movement of the thermostatic element 14 and adapted to be moved thereby. 18 indicates a thrust member which may be provided on the link 17 intermediate its ends and in position to be engaged by the element 14.

19 indicates an abutment carried by the casing 8. The abutment 19 is arranged in the path of movement of the link 17 and is engaged thereby, near its lower or free end, when the link is operated by the element 14. The abutment preferably comprises a rod having screw threads 19ᵃ which engage screw threads in an opening 8ᵉ formed in the casing wall, whereby the free or inner end of the rod can be adjusted to vary or regulate the engagement of the link 17 therewith. The outer end of the rod is provided with an arm 19ᵇ by which the rod may be rotated and the casing 8 may be provided with a plate 8ᵉ′ carrying graduations to indicate the amount of adjustment of the arm 19ᵇ.

In operation, the thermostatic element 14 moves to the left (as viewed in Fig. 6) and engages with and swings the link 17 about its pivot 17ᵃ until the link 17 engages the abutment 19. Upon this engagement taking place, further movement of the element 14 will cause the link to swing about its point of engagement with the abutment 19; this operation in turn will swing the lever 16ª about its pivot 16ᵇ and lift the valve 10 from its seat. The levers 16ª and 17 are preferably so arranged and correlated that the latter will depend vertically and be in contact with the element 14 when it occupies a normal position—that is, its position when the medium to be controlled (the water in tank 1 in the illustrated application of my invention) is at the desired temperature. If now water is drawn from the tank 1 and cool water replaces it, thus lowering the temperature of the water, the tube 13 will contract and cause the element 14 to move endwise and operate the levers, as just described, to unseat the valve 10. This will permit gas to flow through the casing to the jet 6ª and reheat the water to the desired degree of temperature, whereupon the tube 13 will expand and move the element 14 back to normal position. When the levers 16ª and 17 reposition themselves, the valve 10 will seat itself on the seat 9ª, thus shutting off the flow of gas. Should it be desired to keep the water at a higher temperature, the rod or abutment 19 is adjusted inwardly, so as to open the valve at an earlier stage in the movement towards the left of the element 14; on the other hand, if it is desired to keep the water at a lower temperature, the rod or abutment 19 is adjusted in the opposite direction.

When the element 14 moves toward the right (as viewed in Fig. 6), due to rise in temperature of the water in the tank 1, it permits the lever 16ª to swing downwardly to normal position. For this purpose the free end of the lever 16ª may be enlarged to form a weight. As the valve engaging end of the lever recedes, the valve 10 follows it downwardly until it closes the opening 9ª.

From the foregoing description, it will be seen that the levers 16ª, 17 are pivotally connected together and respectively engage the casing 8 and that the thermostatic element 14 engages one of the levers between their points of engagement with the casing, so that a relatively short movement of the element 14 will transmit a relatively long movement to the free end of the valve engaging lever. It will also be seen that by adjusting one of these points, the valve can be made to open at any desired degree of temperature of the water, within certain limits.

24 indicates a by-pass for gas through the wall 9, whereby sufficient gas is at all times supplied to the burner 6ª to keep the same lighted as a pilot. The by-pass is provided with an adjustable element 24ª to regulate the flow of gas therethrough to a minimum amount. When desired a separate pipe may lead from the casing 8 or pipe 6 to a pilot (not shown) adjacent the burner 6ª.

From the foregoing description it will also be seen that the levers 16ª and 17 are so connected together for co-operation that relatively slight movement of the thermostat element 14 will transmit relatively long and quick swinging movement to the free end of the lever 16ª, so that the valve 10 will be actuated to unseat and seat the valve by relatively minute changes in temperature of the medium in the tank 1. The leverage ratio in a system of levers embodying my invention is so large that I am enabled to successively control the supply of fuel for heating rooms simply by supporting the thermostat elements therein.

The levers 16ª and 17 are so shaped that they may be correlated for operation in a relatively small chamber. Furthermore, the levers 16 and 17 are arranged in the chamber 8ª through which the gas flows, so that complicated and undesirable constructions and arrangements of parts necessitating packing glands are avoided.

By my invention I am enabled to use a ball valve which seats itself automatically by gravity as soon as the valve operating mechanism returns to normal position and permits the pressure of the gas to maintain it on its seat until it is unseated therefrom by action of the thermostat.

To those skilled in the art of making mechanism of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In mechanism of the class described, the combination with a casing having a chamber one wall of which is formed with a valve opening, a valve for closing said valve opening and a thermostatic element, of a lever pivotally connected to said casing and having an arm arranged to engage and unseat said valve, a separate arm pivoted to and depending from said lever and arranged in the path of movement of said thermostatic element and adapted to be engaged and moved thereby, and an abutment arranged in the path of movement of said depending arm whereby upon engagement of said arm with said abutment further movement of said thermostatic element will actuate said first mentioned arm.

2. In mechanism of the class described, the combination with a casing having a chamber one wall of which is formed with a valve opening, a valve for closing said valve opening and a thermostatic element, of a lever pivotally connected to said casing and having an arm arranged to engage and unseat said valve, a separate arm pivoted to and depending from said lever and arranged in the path of movement of said thermostatic element and adapted to be engaged and moved thereby, an abutment arranged in the path of movement of said depending arm, whereby upon engagement of said arm with said abutment further movement of said thermostatic element will actuate said first mentioned arm, and means for adjusting said abutment.

3. In mechanism of the class described, the combination with a casing having a chamber one wall of which is formed with a valve opening, a valve for closing said valve opening and a thermostatic element, of a bell crank lever pivoted to said casing, one arm of said lever being arranged to engage and unseat said valve, a devise pivotally connected to and depending from the other arm of said bell crank lever and arranged in the path of movement of said thermostatic element and adapted to be engaged and moved thereby, and an abutment arranged in the path of movement of said depending device, whereby upon engagement of said device with said abutment further movement of said thermostatic element will actuate said bell crank lever.

In testimony whereof I affix my signature.

MILEY W. THOMAS.

Witness:
HARVEY O. YODER.